United States Patent
Boolish et al.

[11] Patent Number: 5,985,479
[45] Date of Patent: Nov. 16, 1999

[54] ELECTROCHEMICAL CELL HAVING CURRENT PATH INTERRUPTER

[75] Inventors: Marcus K. Boolish, Parma, Ohio; Ernest D. Botos, Gainesville, Fla.

[73] Assignee: Eveready Battery Company, Inc., St. Louis, Mo.

[21] Appl. No.: 08/970,633

[22] Filed: Nov. 14, 1997

[51] Int. Cl.[6] .............................. H01M 2/12; H01M 2/34
[52] U.S. Cl. ................................. 429/56; 429/57
[58] Field of Search ...................... 429/53, 56, 57, 429/58, 61, 62, 7

[56] References Cited

U.S. PATENT DOCUMENTS

| | | |
|---|---|---|
| 2,544,115 | 3/1951 | Wagner . |
| 3,617,386 | 11/1971 | Bosben et al. . |
| 4,869,978 | 9/1989 | Kubo et al. ............................ 429/165 |
| 4,871,628 | 10/1989 | Parker ...................................... 429/96 |
| 4,927,720 | 5/1990 | Chaney, Jr. et al. ................... 429/54 |
| 4,931,368 | 6/1990 | Ayers et al. ............................ 429/53 |
| 4,963,446 | 10/1990 | Roels et al. ............................ 429/94 |
| 5,173,371 | 12/1992 | Huhndorff et al. ....................... 429/1 |
| 5,766,790 | 6/1998 | Kameishi et al. ...................... 429/59 |

FOREIGN PATENT DOCUMENTS

| | | |
|---|---|---|
| 0309101A2 | 8/1988 | European Pat. Off. . |
| 0689255A2 | 5/1995 | European Pat. Off. . |
| 0739047A2 | 4/1996 | European Pat. Off. . |

OTHER PUBLICATIONS

Photograph labeled "Moli Energy (1990) Limited 18650." (month N/A), 1990.

*Primary Examiner*—Maria Nuzzolillo
*Assistant Examiner*—Jonathan Crepeau
*Attorney, Agent, or Firm*—Russell H. Toye, Jr.; Robert W. Welsh

[57] ABSTRACT

An electrochemical cell having a cell housing containing active components of the cell and having an inner cover and vent passage provided in the inner cover. A vent with a seal member is force-fitted within the vent passage. A current interrupt contact is provided on an outer cover and facing the seal member for providing electrical contact between the outer cover and a current path of the cell. Upon reaching a predetermined internal cell pressure, the seal member is forcibly released from the vent passage and, at the same time, forcibly engages the current interrupt contact to interrupt the flow of current from within the cell to the outer cover.

20 Claims, 3 Drawing Sheets

ELECTROCHEMICAL CELL HAVING CURRENT PATH INTERRUPTER

BACKGROUND OF THE INVENTION

The present invention generally relates to electrochemical cells and, more particularly to electrochemical cells having current path interruption at high internal pressure.

Electrochemical cells or batteries are commonly used for portable, electrically powered devices. Many devices, such as laptop and handheld computers, portable communications equipment and the like, can put a heavy drain on the cells and batteries used to power them, and those cells/batteries must be capable of delivering adequate power at those high rates. Cells and batteries of certain electrochemical systems and/or designs are better suited for such high rate applications. Included among these are primary and secondary nonaqueous electrolyte systems having negative electrodes based on alkali metals (such as lithium and sodium) and either solid or liquid active positive materials, secondary aqueous electrolyte cells with nickel-based negative electrodes and positive electrodes containing active materials such as cadmium and metal hydrides, and primary and secondary aqueous electrolyte cells having zinc-based negative electrodes and manganese dioxide-based positive electrodes. Galvanic cells are hermetically sealed in a case to prevent loss of electrolyte by leakage. However, under certain conditions, the internal pressure of the cell can increase. For example, increased pressure can be caused by overcharging, overheating, reverse charging, or other abusive conditions. If the cell is permanently sealed, the buildup of internal pressure within the cell could cause the cell container to leak, bulge, or even rupture.

A number of approaches have been considered for preventing or reducing high pressure buildup in a cell due to an abusive condition. One approach is disclosed in U.S. Pat. No. 4,931,368, entitled "Vent Liner and Cover Construction for Galvanic Cells." According to the aforementioned U.S. patent, a vent liner is disposed within a sealing well and a seal member is force-fitted within the vent liner. The vent liner and seal are assembled such that the seal member is at least partially expelled from the vent orifice at a predetermined internal pressure within the cell. This allows for release of the high-pressure fluid from within the cell.

Despite the activation of a venting mechanism during a high-pressure condition, electrical current may continue to flow through the current path of the cell. This can lead to continued charging or discharging of the battery which may generate additional heat and may result in instability of the cell.

SUMMARY OF THE INVENTION

The present invention improves the protective safeguards of the cell with combined pressure venting and current path interruption so as to prevent adverse effects caused by abusive conditions to the cell. To achieve this and other advantages, and in accordance with the purpose of the invention as embodied and described herein, the present invention provides for a cell having a housing containing active materials of the cell with a high-pressure vent that releases fluid from within the cell and at the same time interrupts the current path in the cell. The vent has a seal member which is forcibly discharged from a sealed passage in an inner cover upon reaching a predetermined pressure in the cell to vent high-pressure fluid from the cell. At the same time, the seal member disconnects an electrical connector in the current path of the cell. The electrical connector is preferably connected to an outer cover of the cell and faces the seal member.

These and other features, objects, and benefits of the invention will be recognized by those who practice the invention and by those skilled in the art, from reading the following specification and claims, together with reference to the accompanying drawings.

BRIEF DESCRIPTION OF THE DRAWING FIGURES

DETAILED DESCRIPTION OF THE PREFERRED EMBODIMENTS

Figure 1:
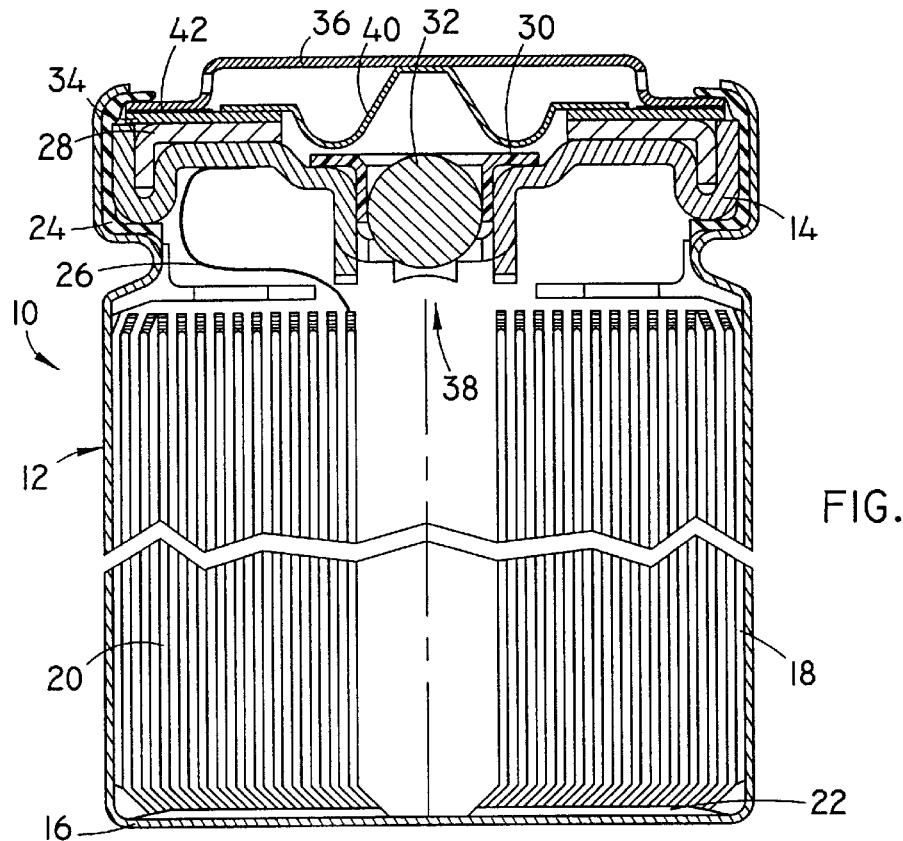
FIG. 1 is an elevational, cross-sectional view of an electrochemical cell having an inactivated current path interrupter in accordance with the present invention.

Referring now to FIG. 1, a cylindrical electrochemical cell 10 is shown generally including as electrochemically active components an anode, a cathode, and a liquid or solid electrolyte. The electrochemical cell 10 more specifically includes a cylindrical cell housing 12 having an open end that is closed by inner cell cover 14. The cylindrical cell housing 12 has a bottom wall 16 and a sidewall 18. Inside cell housing 12 and enclosed by sidewall 18, bottom wall 16, and cell cover 14 are electrochemically active components, preferably including a spiral-wound electrode assembly 20. Preferably, the electrochemical cell 10 of this invention is a secondary electrochemical cell, capable of being repeatedly charged and discharged during cycling.

Electrode assembly 20 includes layers of anode, cathode, and separator. The assembly layers include separate pieces of anode, cathode, and separator, or a strip of anode, a strip of separator, a strip of cathode, and another strip of separator laid next to each other, respectively, and wound to provide a spiral having a plurality of distinct layers. Each layer of anode and cathode has a layer of separator positioned therebetween. Also, every layer has an inner and outer surface. The inner surface is the surface of the layer facing the center of the spiral.

The cathode can be in the form of formed bodies, strips, or even impregnated screens. Any suitable active cathode material known in the art may be used. Examples of suitable cathode materials include transition metal oxides, transition metal sulfides, polycarbon fluoride polymers, and intercalation materials such as lithiated metal oxides, lithiated metal sulfides, and carbonaceous materials. Preferred cathode materials include $LiCoO_2$, $LiNiO_2$, $LiMn_2O_4$, lithiated compound metal oxides containing one or more of cobalt, nickel, and manganese plus one or more other metals, $FeS_2$, $MnO_2$, $(C_2F)_n$, $(CF_x)_n$, $WO_3$, $MoO_3$, $MoS_2$, lead oxides, cobalt oxides, copper oxides, CuS, $CuS_2$, $Bi_2O_3$, $In_2O_3$, NiS, $Ag_2CrO_4$, $Ag_3PO_4$, and $TiS_2$. Preferably, the cathode material is provided in strip form by coating a mixture of active cathode material, binder, and conductive agent onto or incorporating such a mixture into a carrier. Although expanded metal screens are suitable carriers, the preferred carrier is a metal foil. Suitable metal foil carriers are those known in the art for such a purpose, preferably a highly corrosion resistant metal foil, such as aluminum foil.

The anode can be in the form of formed bodies, strips, foils, or impregnated screens. It is preferred that the anode be in the form of a coated metal foil or a strip. Examples of suitable anode materials include the alkali metals, alkaline earth metals, other metals and alloys thereof, as well as materials capable of intercalating and deintercalating alkali and alkaline earth metal ions. Preferred alkali and alkaline earth metals are lithium, sodium, potassium, calcium, and manganese. Generally, lithium is most preferred. Examples of materials that are capable of being intercalated with lithium ions are well-known in the art and include carbonaceous materials, such as graphite, amorphous carbon, and mesophase carbon, transition metal oxides, transition metal sulfides, and amorphous metal oxides containing silicon and/or tin.

An ionically conductive, electrically insulating material known in the art may be used to form the separator. Examples of suitable separator materials are microporous, polypropylene, and polyethylene films, and non-woven materials such as non-woven polypropylene or glass fiber mats.

To complete the chemically active portion of this cell 10, a liquid or solid electrolyte is employed. The electrolyte will vary depending upon the particular anode and cathode used. The present invention is not limited to any particular electrochemistry, but it is particularly advantageous for secondary cells, especially secondary, non-aqueous cells. Examples of suitable electrolytes include aqueous and non-aqueous solutions containing metal salt solutes. Preferred liquid electrolytes when alkali and alkaline earth metals are employed include organic solvents or mixtures thereof containing dissolved alkali or alkaline earth metal salts, e.g., one or more of ethylene carbonate, dimethyl carbonate, diethyl carbonate, tetrahydrofuran, dioxolane, propylene carbonate, and dimethoxyethane containing, for example, $LiPF_6$, $LiClO_4$, and/or $LiCF_3SO_3$. Alternatively, solid electrolytes may be used instead of liquid electrolytes. Solid electrolytes are ionically conductive and are generally electrically non-conductive. Layers of electrically non-conductive solid electrolyte may be used in place of layers of separator between anode and cathode layers. Any suitable solid electrolyte known in the art may be used.

In the embodiment shown, a bottom insulator disk 22 and electrode assembly 20 are first inserted into cell housing 12. The anode tab is then welded to the bottom of the cell housing, and cell housing 12 is beaded. A gasket 24 is placed into the cell housing 12 on top of the bead. A cathode tab 26 is then welded to the inside surface of inner cover 14, and the cover 14 is inserted into the open end of the cell 10. A support ring 28 is then inserted on the outer side of cover 14. The diameter of the top of the cell 10 is reduced to lock the cover and ring in place.

Figure 3:
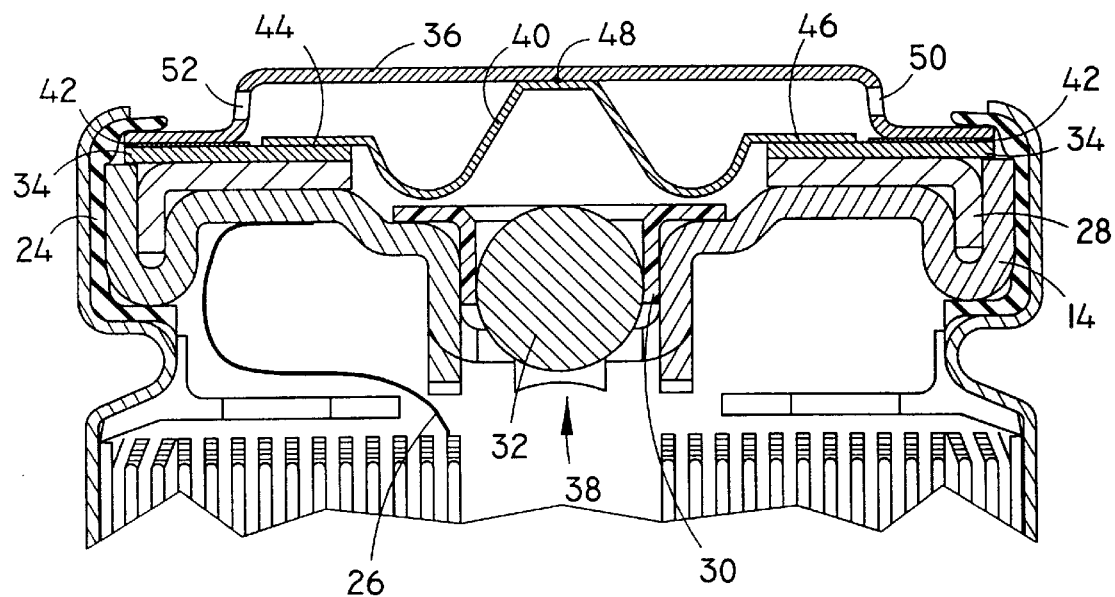
FIG. 3 is an enlarged fragmentary, cross-sectional view of the electrochemical cell of FIG. 1.

As seen in FIGS. 1 and 3, a vent liner, such as bushing 30, is placed into a passage 38 in the inner cover 14, and the cell is filled with electrolyte. A vent seal member 32, such as a stainless steel ball, is then disposed within bushing 30 to seal the passage 38 of cell 10. The seal member 32 preferably has a smooth spherical configuration and, together, bushing 30 and vent seal member 32 form a force-fitted seal which may be forcibly ejected from the passage 38 to vent fluid from within the cell during a high-pressure condition. It is presently preferred that bushing 30 be a molded liner of an injection moldable fluoropolymer resin, such as TEFZEL® 200, made available from E. I. duPont deNemours & Company, although other materials, such as polyethylene, may be suitable. An example of such a vent mechanism containing a steel ball and a vent liner is disclosed in U.S. Pat. No. 4,931,368, which is hereby incorporated by reference.

A positive temperature coefficient (PTC) polyswitch 34 and an outer cover 36 are placed onto the top of the cell 10. The PTC polyswitch 34 is a current-induced, temperature-sensitive, current limiting switch. When a predetermined high current is reached, the resistance of PTC polyswitch 34 increases to limit current flow therethrough.

The outer cover 36 contains a thin non-conductive film 42 disposed on the bottom surface at least along its outer extending peripheral rim. Non-conductive film 42 could include an insulating washer, insulating tape, or thin resin coating which dielectrically insulates the outer rim of outer cover 36 from the PTC polyswitch 34. The non-conductive film 42 can be applied as a resin to the bottom surface of outer cover 36 by known roll-coating or spray-on techniques and cured with known ultraviolet or heat curing techniques, as well as chemical curing and evaporation curing techniques. Non-conductive layer 42 may include a non-conductive, liquidous resin, such as ENVIBAR® X0281R resin, which is made available by Union Carbide Corporation. A roll-coating apparatus can apply a thin coating of non-conductive resin to the bottom surface of outer cover 36, and preferably just to the outer extending peripheral portion thereof. The resin may be cured with a curing oven that is equipped with ultraviolet light, according to one example. A curing period of approximately five seconds may be sufficient to cure the non-conductive resin having a thickness ranging from two to three mils. Accordingly, the non-conductive film 42 prevents current flow directly from the PTC polyswitch 34 to the outer peripheral rim of the positive outer cover 36. In addition, gasket 24 dielectrically isolates the positive outer cover 36 from the metal housing 12.

According to the present invention, the outer cover 36 has a conductive spring-like contact 40 preferably spot-welded to the bottom surface of cover 36 at or near a central point 48 for providing electrical contact between the outer cover 36 and the current path within cell 10 during normal cell operation. Conductive contact 40 has a pair of spring-like arms with contact surfaces 44 and 46 for forcibly contacting the top surface of the PTC polyswitch 34. In addition, one or both of spring arms 44 and 46 could be fastened to PTC polyswitch 34 by means such as spot welding. Accordingly, an interruptible current path is provided from outer cover 36 to PTC polyswitch 34 via conductive contact 40. PTC polyswitch 34 is also in electrical contact with support ring 28 and inner cover 14 which, in turn, is coupled to cathode tab 26 to complete the current path from the cathode to the positive outer cover 36.

The vent seal member 32 and bushing 30 are assembled into cover 14 to seal passage 38 under normal cell operating conditions. The vent seal member 32, or both vent seal member 32 and bushing 30 are together designed to release from inner cover 14 upon reaching a predetermined pressure within cell 10. Preferably, the predetermined pressure may range from approximately 150 to 350 psi, and may vary as a function of temperature. Upon reaching the predetermined pressure, vent seal member 32, with or without bushing 30, releases from inner cover 14 so as to open passage 38 and allow fluid within the cell 10 to vent through passage 38 and vent openings, such as openings 50 and 52, provided in outer cover 36.

Figure 2:
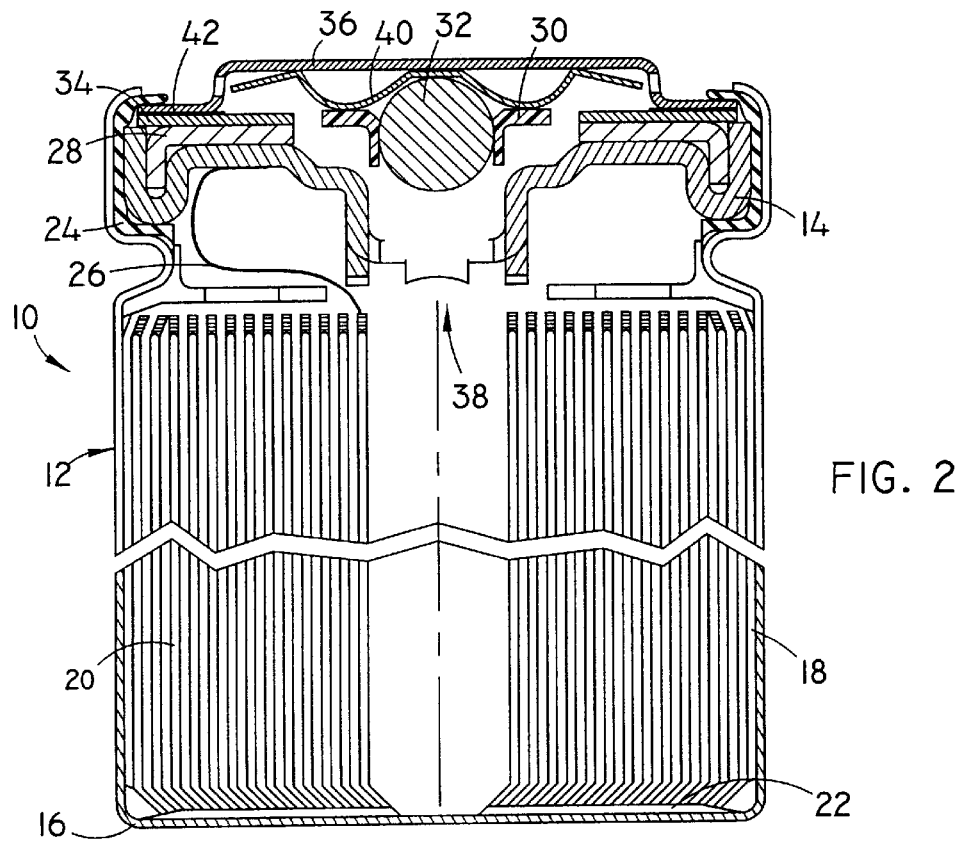
FIG. 2 is an elevational, cross-sectional view of the electrochemical cell of FIG. 1 with the current path interrupter activated.
Figure 4:
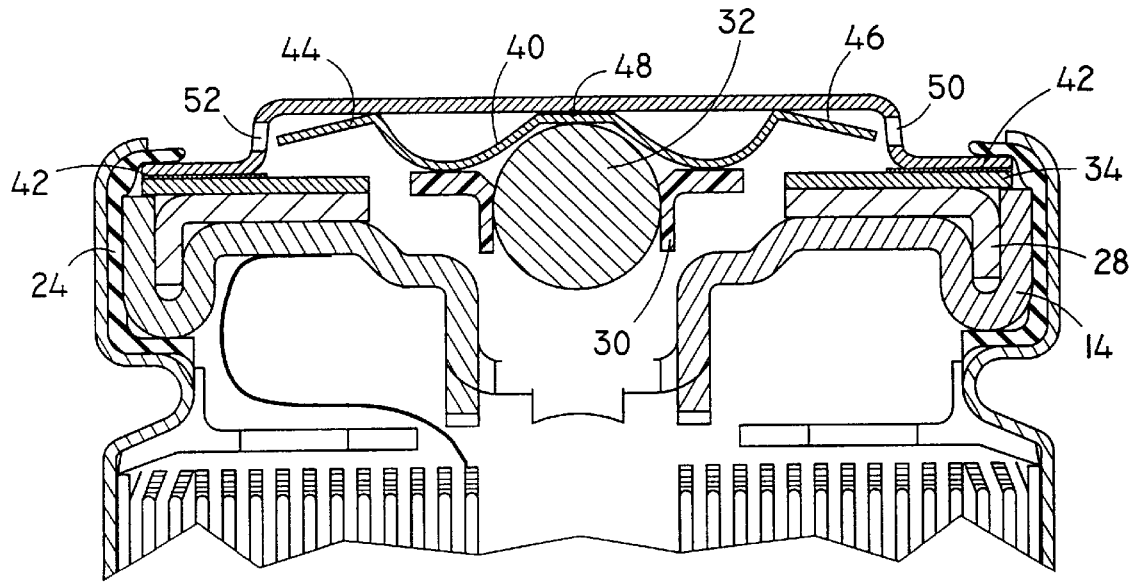
FIG. 4 is an enlarged fragmentary, cross-sectional view of the electrochemical cell of FIG. 2.

The conductive spring-like contact 40 is assembled directly facing seal member 32 and bushing 30 of the vent mechanism. Upon reaching the predetermined vent pressure, the vent seal member 32, with or without bushing 30, releases from inner cover 14 and is forcibly urged against conductive contact 40, as shown in FIGS. 2 and 4. Vent seal member 32, with or without bushing 30, is urged with sufficient force to permanently deform conductive contact 40 so as to break the electrical connection between each of arms 44 and 46 and PTC polyswitch 34. This effectively interrupts the current path between the PTC polyswitch 34 and positive outer cover 36 which discontinues any further charging or discharging of the cell and prevents further unnecessary heating of the cell. Accordingly, vent seal member 32, with or without bushing 30, is released to simultaneously vent high pressure from within cell 10 and interrupt the current path to the positive outer cover 36. This combined high pressure venting and current path interruption renders the cell 10 inoperable.

Figure 5:
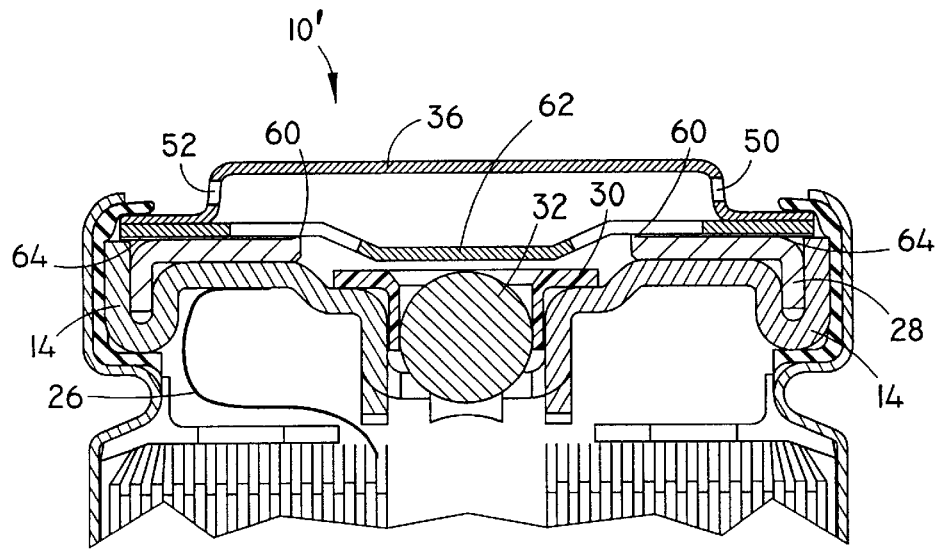
FIG. 5 is a fragmentary, cross-sectional view of an electrochemical cell having a current path interrupter according to an alternate embodiment of the present invention.
Figure 6:
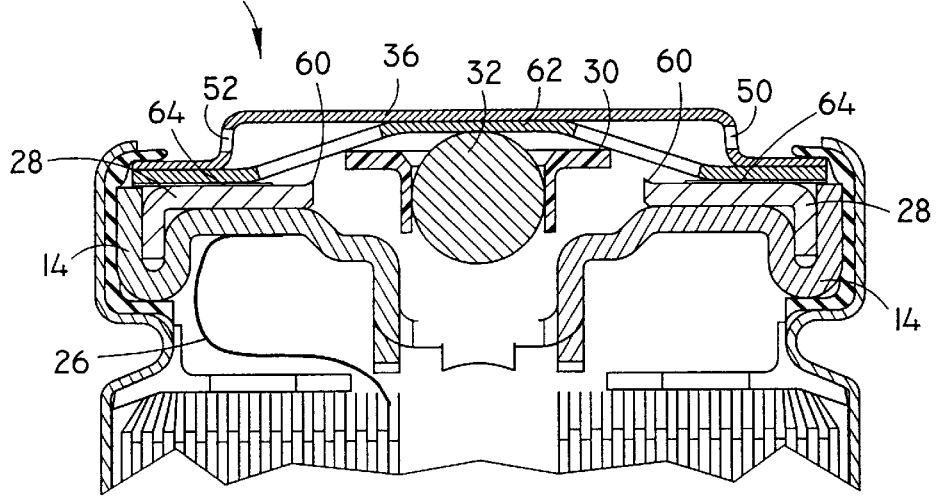
FIG. 6 is a fragmentary, cross-sectional view of the electrochemical cell of FIG. 5 showing the current path interrupter activated.

Turning to FIGS. 5 and 6, an electrochemical cell 10' is shown having a current path interrupter according to a second embodiment of the present invention. The electrochemical cell 10' is equipped with the same vent mechanism having seal member 32 and bushing 30 force-fitted within passage 38 of inner cover 14. However, support ring 28 has a raised edge 60 and a circular contact surface 62 is disposed on top of support ring 28. Circular contact surface 62 is preferably provided as a PTC polyswitch configured as a thin disk. A thin, non-conductive layer 64 is disposed between support ring 28 and contact surface 62, with the exception of the protruding edge 60 directly contacting contact surface 62 during normal cell operation. The contact surface 62 is further in direct contact with the outer cover 36. As shown in FIG. 5, with the sealing member 32 force-fitted together with the bushing 30 in inner cover 14, a closed electrical current path is provided through the cathode, cathode tab 26, inner cover 14, support ring 28, and its raised inner edge 60 to contact surface 62, and finally to the positive outer cover 36.

Upon forcibly discharging from its sealed position, the sealing member 32, with or without bushing 30, forcibly impacts with and urges the circular contact surface 62 toward the outer cover 36, as shown in FIG. 6, to break the current path and thereby cause an interruption in current flow. With the current path interrupter activated, the circular contact surface 62 is raised into its interrupted state such that contact between the raised inner edge 60 of support ring 28 and circular contact surface 62 is disconnected.

Figure 7:
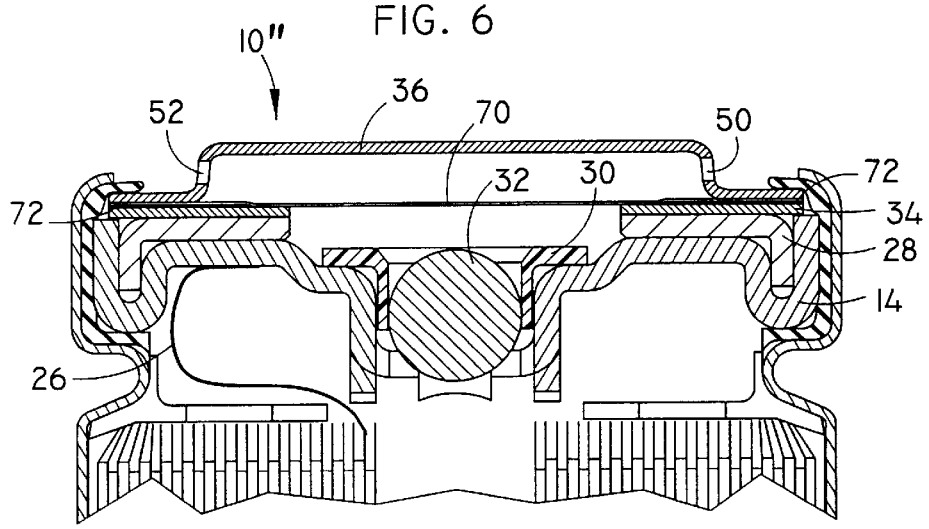
FIG. 7 is a fragmentary, cross-sectional view of an electrochemical cell having a current path interrupter according to yet another embodiment of the present invention.

According to a third embodiment, an electrochemical cell 10" is provided as shown in FIG. 7. Cell 10" has a conductive strip 70 extending above the PTC polyswitch 34 and above vent seal member 32 and bushing 30. A thin, non-conductive layer 72 is disposed partially between the conductive strip 70 and PTC polyswitch 34, such that only a portion of strip 70 nearest the central portion of cell 10" contacts the PTC polyswitch 34. It is preferred that conductive strip 70 is fastened to PTC polyswitch 34, such as by one or more spot welds. With the vent seal member 32 force-fitted in place together with bushing 30 in inner cover 34, a current path is provided through the cathode, cathode tab 26, inner cover 14, support ring 28, PTC polyswitch 34, conductive strip 70, and positive outer cover 36.

Upon discharging from inner cover 14, the seal member 32, with or without bushing 30, is forcibly dislodged upward so as to contact and force the conductive strip 70 toward the positive outer cover 36. This causes the conductive strip 70 to bend upwards, away from and out of contact with the PTC polyswitch 34 so as to interrupt current flow through cell 10".

Accordingly, it should be appreciated that the electrochemical cell 10 of the present invention provides a current path interrupter which interrupts current flow through cell 10 at the same time that fluid is vented from the cell housing. In addition to venting fluid, the current path interrupter interrupts current flow through the cell 10 so as to prevent continued charging or discharging of cell 10, thereby rendering the cell inoperable.

It will be understood by those who practice the invention and those skilled in the art, that various modifications and improvements may be made to the invention without departing from the spirit of the disclosed concept. The scope of protection afforded is to be determined by the claims and by the breadth of interpretation allowed by law.

The embodiments of the invention in which an exclusive property or privilege is claimed are defined as follows:

1. An electrochemical cell comprising:
    a cell housing containing active components of the cell and having an inner cover;
    a vent liner containment section formed in said cell housing and providing a vent passage through said inner cover;
    a seal member sealingly disposed within the vent passage, wherein said seal member is adapted such that said seal member will be at least partially expelled from said vent passage at a predetermined internal pressure within the cell to vent pressurized fluid;
    a conductive outer cover assembled to said cell housing; and
    a current interrupt contact facing said seal member, said current interrupt contact providing electrical connection between said outer cover and a current path in said cell, wherein said electrical connection provided by said current interrupt contact is disconnected when said seal member is at least partially expelled from said vent passage so as to interrupt current flow in said current path at the same time the seal member vents.

2. The electrochemical cell as defined in claim 1, wherein said current interrupt contact is connected to an inner surface of said outer cover.

3. The electrochemical cell as defined in claim 1, wherein said current path includes a positive temperature coefficient switch.

4. The electrochemical cell as defined in claim 1, wherein said current interrupt contact has at least one conductive arm biased into contact with a conductive surface of said current path.

5. The electrochemical cell as defined in claim 4, further comprising a non-conductive material disposed between said outer cover and said conductive surface.

6. The electrochemical cell as defined in claim 5, wherein said non-conductive material is disposed about an outer perimeter of said outer cover, and said current interrupt contact is connected to an inner surface of said outer cover.

7. The electrochemical cell as defined in claim 1, wherein said current interrupt contact comprises a pair of resilient conductive arms connected to said outer cover and adapted to bias a conductive surface of said current path.

8. The electrochemical cell as defined in claim 1, wherein said current interrupt contact comprises a substantially circular conductive sheet.

9. The electrochemical cell as defined in claim 1, wherein said current interrupt contact comprises a conductive strip positioned to receive said seal member.

10. An electrochemical cell comprising:

a cell housing containing active components of the cell including an anode, a cathode, and a separator, said cell housing having an inner cover;

a vent passage provided in said inner cover;

a seal member force-fitted within said vent passage, wherein said seal member is adapted such that said seal member will be at least partially expelled from said vent passage at a predetermined internal pressure within the cell to vent pressurized fluid;

a conductive outer cover assembled to the cell housing and covering said seal member;

a non-conductive medium dialectically isolating said outer cover from said housing; and a current interrupt contact connected to said outer cover for providing an electrical connection between said outer cover and a current path of the cell, wherein said current interrupt contact faces said seal member such that said electrical connection of said current interrupt contact is interrupted when said seal member is at least partially expelled from said passage to interrupt current flow in said current path at the same time the seal member vents.

11. The electrochemical cell as defined in claim 10, wherein said contact has at least one conductive arm forcibly urged into contact with a conductive surface of said current path.

12. The electrochemical cell as defined in claim 11, further comprising a non-conductive layer disposed between said outer cover and said conductive surface.

13. The electrochemical cell as defined in claim 12, wherein said conductive surface includes a positive temperature coefficient switch.

14. The electrochemical cell as defined in claim 11, wherein said current interrupt contact is connected to a bottom surface of said outer cover at a central location, wherein other portions of said outer cover contain a thin non-conductive layer between said outer cover and said conductive surface.

15. The electrochemical cell as defined in claim 10, wherein said current interrupt contact comprises a pair of resilient conductive arms connected to said outer cover and adapted to bias a conductive surface of said current path.

16. The electrochemical cell as defined in claim 10, wherein said current interrupt contact comprises a substantially circular conductive sheet.

17. The electrochemical cell as defined in claim 10, wherein said current interrupt contact comprises a conductive strip positioned to receive said seal member.

18. An electrochemical cell comprising:

a cell housing containing active components of said cell including an anode, a cathode, and a separator;

an inner cover assembled to said cell housing and having a vent passage provided in said inner cover;

a seal member force-fitted within said vent passage, wherein said seal member is adapted such that said seal member will be at least partially expelled from said vent passage at a predetermined internal pressure within the cell to vent pressurized fluid;

a conductive outer cover assembled to the cell housing and covering said seal member;

a non-conductive medium disposed between a contact surface on said outer cover and a conductive material within said housing; and a current interrupt contact connected to said outer cover for providing an electrical connection between said outer cover and a current path of the cell, wherein said current interrupt contact faces said seal member such that said electrical connection of said contact is interrupted when said seal member is at least partially expelled from said passage to interrupt current flow in said current path at the same time the seal member vents.

19. The electrochemical cell as defined in claim 18, wherein said conductive material is included in said current path.

20. The electrochemical cell as defined in claim 18, wherein said non-conductive material is disposed about an outer perimeter of said outer cover, and said current interrupt contact is connected to an inner surface of said outer cover.

* * * * *